(12) United States Patent
Miyashita

(10) Patent No.: US 9,573,341 B2
(45) Date of Patent: Feb. 21, 2017

(54) MULTI-LAYER COMPOSITE PART

(71) Applicant: Osamu Miyashita, Toyota (JP)

(72) Inventor: Osamu Miyashita, Toyota (JP)

(73) Assignee: Toyoda Iron Works Co., Ltd., Toyota-shi, Aichi (JP)

( * ) Notice: Subject to any disclaimer, the term of this patent is extended or adjusted under 35 U.S.C. 154(b) by 0 days.

(21) Appl. No.: 14/649,142

(22) PCT Filed: Mar. 6, 2013

(86) PCT No.: PCT/JP2013/056191
§ 371 (c)(1),
(2) Date: Jun. 2, 2015

(87) PCT Pub. No.: WO2014/087678
PCT Pub. Date: Jun. 12, 2014

(65) Prior Publication Data
US 2015/0306842 A1  Oct. 29, 2015

(30) Foreign Application Priority Data
Dec. 6, 2012  (JP) .................. 2012-267595

(51) Int. Cl.
B32B 3/30 (2006.01)
B32B 27/08 (2006.01)
(Continued)

(52) U.S. Cl.
CPC . *B32B 3/30* (2013.01); *B32B 3/04* (2013.01); *B32B 5/02* (2013.01); *B32B 27/08* (2013.01);
(Continued)

(58) Field of Classification Search
CPC ............... Y10T 428/24182; B32B 3/30; B32B 2605/003
(Continued)

(56) References Cited

U.S. PATENT DOCUMENTS

2010/0264680 A1  10/2010  Ishikawa

FOREIGN PATENT DOCUMENTS

CN         101870275 A       10/2010
DE    10 2012 220 858 A1     5/2013
(Continued)

OTHER PUBLICATIONS

English language translation of JP 2003-103676, published Apr. 9, 2003.
(Continued)

*Primary Examiner* — Alexander Thomas
(74) *Attorney, Agent, or Firm* — Finnegan, Henderson, Farabow, Garrett & Dunner, LLP

(57) ABSTRACT

A laminated composite part includes a first member comprising a predetermined mating surface, and a second member that is made of an elastically deformable resin material, that comprises a plate-like portion substantially parallel to the mating surface and including a multiplicity of protrusions formed integrally with the plate-like portion, and that is set on the first member such that the protrusions contact the mating surface. The multiplicity of protrusions are formed so as to spread all over the plate-like portion, and a deformation guide portion is provided for each protrusion in a region of the mating surface the tip end of the protrusion contacts, so that when the protrusion is pressed, the deformation guide portion causes the tip end of the protrusion to slide and move along the mating surface in one direction determined for each protrusion and flexurally deforms the protrusion in the one direction.

9 Claims, 13 Drawing Sheets

(51) Int. Cl.
*B32B 27/30* (2006.01)
*B32B 27/32* (2006.01)
*B32B 3/04* (2006.01)
*B32B 5/02* (2006.01)
*B32B 27/12* (2006.01)
*B32B 27/36* (2006.01)
*B32B 3/06* (2006.01)
*B32B 7/02* (2006.01)
*B32B 7/04* (2006.01)
*B32B 3/08* (2006.01)

(52) U.S. Cl.
CPC ............ *B32B 27/12* (2013.01); *B32B 27/302* (2013.01); *B32B 27/304* (2013.01); *B32B 27/32* (2013.01); *B32B 27/36* (2013.01); *B32B 3/06* (2013.01); *B32B 3/085* (2013.01); *B32B 7/02* (2013.01); *B32B 7/045* (2013.01); *B32B 2250/02* (2013.01); *B32B 2250/03* (2013.01); *B32B 2307/51* (2013.01); *B32B 2307/536* (2013.01); *B32B 2307/56* (2013.01); *B32B 2451/00* (2013.01); *B32B 2605/003* (2013.01); *B32B 2605/08* (2013.01)

(58) Field of Classification Search
USPC ........................................................ 428/120
See application file for complete search history.

(56) References Cited

FOREIGN PATENT DOCUMENTS

| | | |
|---|---|---|
| EP | 2 243 658 A1 | 10/2010 |
| JP | 2000-085434 A | 3/2000 |
| JP | 2003-103676 | 4/2003 |

OTHER PUBLICATIONS

Search Report issued in European Application No. 13 860 800.5 on Jul. 12, 2016.

Office Action issued in Chinese Application No. 201380063578.5 on Aug. 26, 2016.

MULTI-LAYER COMPOSITE PART

CROSS-REFERENCE TO RELATED APPLICATIONS

This application is a national phase application of International Application No. PCT/JP2013/056191, filed Mar. 6, 2013, and claims the priority of Japanese Application No. 2012-267595, filed Dec. 6, 2012, the content of both of which is incorporated herein by reference.

TECHNICAL FIELD

The present invention relates to laminated composite parts, and more particularly to a technique of further improving the feel of a laminated composite part having cushioning properties due to elastic deformation of a multiplicity of protrusions.

BACKGROUND ART

Laminated composite parts are known which have (a) a first member having a predetermined mating surface, and (h) a second member that is made of an elastically deformable resin material, that has a plate-like portion substantially parallel to the mating surface and having a multiplicity of protrusions formed integrally therewith so as to protrude toward the mating surface so that space is created between the plate-like portion and the mating surface, and that is set on the first member such that the protrusions contact the mating surface, and (c) which have cushioning properties as tip ends of the protrusions are pressed by the mating surface and elastically deformed. A part described in Patent Document 1 is an example of such a laminated composite part, and relates to an interior part (armrest etc.) of a vehicle. Patent Document 1 describes a technique of providing a multiplicity of pin-shaped protrusions on the back surface of a surface materials the second member to improve the feel (soft feel) of the surface material by elastic deformation of the protrusions. Patent Document 1 also describes a technique of providing ribs instead of the pin-shaped protrusions.

RELATED ART DOCUMENTS

Patent Documents

Patent Document 1: Japanese Patent Application Publication No. 2003-103676

SUMMARY OF THE INVENTION

Problem to be Solved by the Invention

However, in such conventional laminated composite parts, the multiplicity of pin-shaped protrusions are merely pressed against the flat mating surface. Accordingly, the deformation manner (flexural deformation direction etc) of the protrusions during elastic deformation due to a pressing load is not stabilized, which tends to cause variation in feel. In the case of providing the ribs instead of the multiplicity of protrusions, rigidity is increased, and the feel is less likely to be soft enough.

The present invention was developed in view of the above circumstances, and it is an object of the present invention to further improve the feel of a laminated composite part that has cushioning properties due to elastic deformation of a multiplicity of protrusions.

Means for Solving the Problem

To achieve the object, the first aspect of the invention provides a laminated composite part, which includes (a) a first member comprising a predetermined mating surface, and (h) a second member that is made of an elastically deformable resin material, that comprises a plate-like portion substantially parallel to the mating surface and including a multiplicity of protrusions formed integrally with the plate-like portion so as to protrude toward the mating surface so that space is created between the plate-like portion and the mating surface, and that is set on the first member such that the protrusions contact the mating surface, (c) the laminated composite part having cushioning properties as tip ends of the protrusions are pressed by the mating surface and elastically deformed, the laminated composite part characterized in that (d) the multiplicity of protrusions are formed so as to spread all over the plate-like portion, and (e) a deformation guide portion is provided for each protrusion in a region of the mating surface the tip end of the protrusion contacts, so that when the protrusion is pressed, the deformation guide portion causes the tip end of the protrusion to slide and move along the mating surface in one direction determined for each protrusion and flexurally deforms the protrusion in the one direction.

The second aspect of the invention provides the laminated composite part recited in the first aspect of the invention, wherein an accommodating recess that accommodates the protrusion flexurally deformed in the one direction is provided in the mating surface so as to be continuous with the deformation guide portion.

The third aspect of the invention provides the laminated composite part recited in the second aspect of the invention, wherein the accommodating recess has a curved surface smoothly curved in the one direction in which the protrusion is flexurally deformed, and the protrusion is flexurally deformed along the curved surface.

The fourth aspect of the invention provides the laminated composite part recited in any one of the first to the third aspects of the invention, wherein the deformation guide portion is a tilted surface tilted with respect to a plane perpendicular to a centerline of the protrusion.

The fifth aspect of the invention provides the laminated composite part recited in the fourth aspect of the invention, wherein a stopper with which the tip end of the protrusion comes into contact is provided on a downstream side of the tilted surface to restrict a certain amount or more of flexural deformation of the protrusion.

The sixth aspect of the invention provides the laminated composite part recited in any one of the first to the third aspects of the invention, wherein the deformation guide portion is a textured surface (a surface having fine unevenness such as a fabric woven to have a surface like a pear) provided on the mating surface to hinder the sliding movement of the tip end of the protrusion in an opposite direction to the one direction by friction.

The seventh aspect of the invention provides the laminated composite part recited in any one of the first to the sixth aspects of the invention, wherein (a) each set of the protrusions are formed by a pair of the protrusions arranged in line in one linear direction, and a pair of the deformation guide portions are provided for each pair of the protrusions in each set, and (b) each pair of the deformation guide portions for each set are provided symmetrically in the one linear direction so that the tip ends of the pair of the protrusions slide and move toward each other in the one linear direction.

The eighth aspect of the invention provides the laminated composite part recited in any one of the first to the sixth aspects of the invention, wherein (a) the multiplicity of protrusions are positioned so as to form each side of a multiplicity of polygons so that the protrusions form a grid pattern in which adjoining ones of the polygons have a common side, (b) the polygons are squares or hexagons, and the protrusions are provided one by one on each side of the polygons, and (c) the deformation guide portions are provided so that flexural deformation directions of the protrusions are inward or outward of the polygons and the flexural deformation directions of the protrusions are alternately inward and outward of the polygon around a center of each polygon.

The ninth aspect of the invention provides the laminated composite part recited in any one of the first to the eighth aspects of the invention, wherein (a) the second member is a surface layer member, and (b) the first member is a plate-like base material made of a resin material harder than the surface layer member.

Effects of the Invention

In the laminated composite part described above, the multiplicity of protrusions are formed so as to spread all over the plate-like portion. These protrusions are flexurally deformed in the one direction determined for each protrusion by the deformation guide portion provided on the mating surface. This facilitates flexural deformation of the protrusions and improves the soft feel (cushioning properties). The flexural deformation direction of each protrusion can be controlled. The deformation manner of the protrusions during elastic deformation is stabilized, and variation in feel obtained when pressing the second member with a finger or hand is suppressed. Moreover, the flexural deformation directions of the multiplicity of protrusions are independently determined. Accordingly, for example, by densely arranging the protrusions in such a range that the protrusions do not interfere with each other or densely arranging the protrusions such that the protrusions interfere with each other in a predetermined deformed state, it is possible to suppress variation in feel due to the presence and absence of the protrusions, and to ensure a predetermined soft feel based on elastic deformation of the protrusions.

In the second aspect of the invention, an accommodating recess that accommodates the protrusion flexurally deformed is provided so as to be continuous with the deformation guide portion, and the protrusions flexurally deformed enter into the accommodating recess. Accordingly, for example, even if the plate-like portion is pressed until it comes into contact with the mating surface of the first member, unevenness of the pressed surface (design surface) due to the presence and absence of the protrusions is absorbed by the accommodating recesses. This eases discomfort caused by the unevenness when pressing the second member, and further improves the feel.

In the third aspect of the invention, since the accommodating recess has the curved surface, the protrusion is smoothly and flexurally deformed along the curved surface, and the reaction force when the second member is pressed is smoothly increased, which further improves the feel.

The fourth aspect of the invention is the case that a tilted surface tilted with respect to a plane perpendicular to a centerline of the protrusion is provided as the deformation guide portion, and each protrusion can therefore be reliably and smoothly flexurally deformed in the one direction that is determined by the tilted surface. Moreover, the soft feel can be easily adjusted by controlling flexural deformability of the protrusions by changing the tilt angle of the tilted surface.

Since the fifth aspect of the invention is provided with a stopper on a downstream side of the tilted surface and a flexural deformation amount of the protrusions is restricted by the contact of the tip ends of the protrusions, the reaction force that is applied to the second member is increased, whereby an appropriate rigid feel (not too soft) can be obtained. A further improved feel can be achieved by this rigid feel together with the soft feel obtained by the elastic deformation in the initial stage of deformation of the protrusions.

The sixth aspect of the invention is the case that as the deformation guide portion, a textured surface to hinder the sliding movement of the tip end of the protrusion in an opposite direction to the one direction by friction is provided, and the textured surfaces need only be formed in the predetermined regions of the mating surface of the first member. The present embodiment can therefore be easily implemented by, e.g., providing the textured surfaces simultaneously with molding of the first member by the resin material.

In the seventh aspect of the invention, each set of the protrusions are formed by a pair of the protrusions arranged in line in one linear direction, and a pair of the deformation guide portions are provided for each pair of the protrusions in each set, and each pair of the protrusions are flexurally deformed so that the tip ends of the pair of the protrusions slide and move toward each other in the one linear direction in this case, the arrangement pattern of the protrusions and the deformation guide portion can be set for each set. This facilitates setting of the arrangement pattern. Moreover, the soft feel and the rigid feel can be easily tuned for each set. The plate-like portion as the second member having the pair of protrusions is subjected to a force that curves the plate-like portion so that the plate-like portion protrudes in the opposite direction from the protrusions due to a deformation reaction force of the protrusions. Accordingly, in the case where the second member is the surface layer member and the plate-like portion is pressed, a reaction force in an intermediate portion between the pair of protrusions is increased, whereby variation between the reaction force in the intermediate portion and the reaction force in the regions where the protrusion is provided is reduced.

The eighth aspect of the invention is that the multiplicity of protrusions are positioned so as to form each side of a multiplicity of polygons so that the protrusions form a grid pattern in which adjoining ones of the polygons have a common side, and therefore, the multiplicity of protrusions can thus be arranged in a fixed arrangement pattern, which suppresses variation in feel when pressing the second member with a finger or hand. Especially, the polygons are squares or hexagons, and the protrusions are provided one by one on each side of the polygons, and the deformation guide portions are provided so that the flexural deformation directions of the protrusions are inward or outward of the polygons and flexural deformation directions of the protrusions are alternately inward and outward of the polygon around a center of each polygon. Accordingly, densely arranging the protrusions in such a range that the protrusions do not interfere with each other or densely arranging the protrusions such that the protrusions interfere with each other in a predetermined deformed state can suppress variation in feel due to the presence and absence of the protrusions.

The ninth aspect of the invention is the case that the second member is a surface layer member, and the first member is a plate-like base material harder than the surface layer member. Therefore, the predetermined rigidity and strength are ensured by the base material, and the surface layer member has an excellent feel when pressed by a finger or hand due to elastic deformation of the protrusions provided on the surface layer member.

BRIEF DESCRIPTION OF THE DRAWINGS

FIGS. 2(a) and 2(b) snow diagrams illustrating the multiplicity of fine protrusions formed on the back surface of the surface layer member of the ornament of FIG. 1, wherein FIG. 2(a) is a plan view showing the fine protrusions close to their actual size, and FIG. 2(b) is an enlarged plan view of a portion IIb in FIG. 2(a).

MODES FOR CARRYING OUT THE INVENTION

Figure 1:
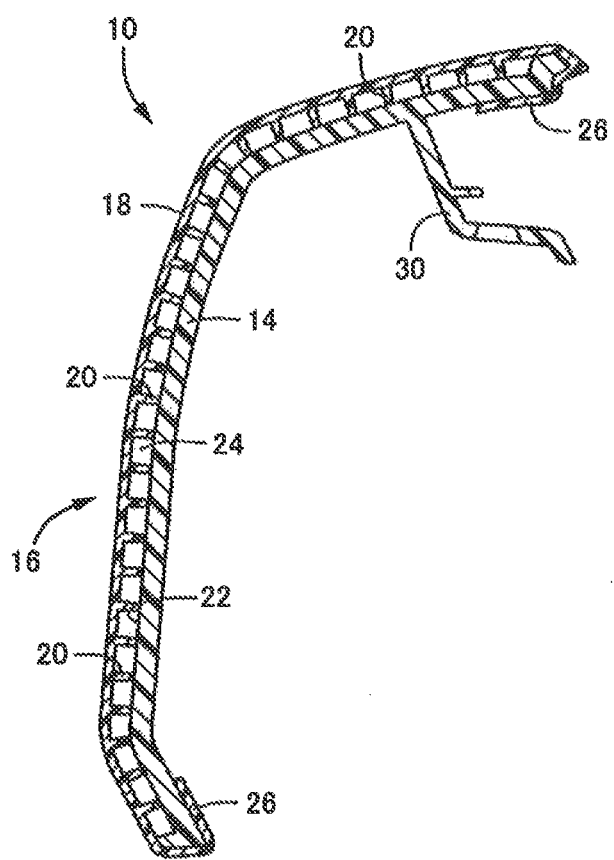
FIG. 1 is a vertical section of an ornament to which the present invention is applied.

The present invention is applied to vehicle interior parts such as a door trim, a luggage side trim, and an instrument panel, and ornaments etc. that are attached to the interior parts, but is also applicable to panel parts for applications other than vehicle applications. The present invention is applicable not only to plate-like panel parts but also three-dimensional parts in which the second member is set on the surface of the first member or base material curved three-dimensionally and having a three-dimensional shape. In the case of using the first member as the base material, relatively hard synthetic resin materials are preferably used such as rigid polyvinyl chloride, polypropylene, polyethylene, and ABS. However, other materials such as a metal may be used. In the case of using the first member as the surface layer member, or for the resin material of the second member, various thermoplastic resins are preferably used such as soft polyvinyl chloride, styrene resin, olefin resin, and polyester resin. The surface material may further be bonded to the surface layer member. For example, not only various thermoplastic resins such as soft polyvinyl chloride, styrene resin, olefin resin, and polyester resin, but also various surface materials such as woven fabric, nonwoven fabric, knitted fabric, vinyl chloride, and a soft film may be used as the surface material. In the case of using the first member as the surface layer member, a relatively hard base material may be provided on the back surface (on the opposite side from the protrusions) of the second member as necessary.

The multiplicity of protrusions that provide the cushioning properties have, e.g., a rectangular shape as viewed in plan, but may have various shapes such as a square shape, a circular shape, an elliptical shape, or an arc-curved shape. Each protrusion may have a continuously changed sectional shape along its protruding direction, such as a tapered shape in which its sectional area decreases as it gets closer to its tip end, or may have an asymmetrical shape with respect to a centerline in order to facilitate bending in one direction. The multiplicity of protrusions may have the same shape, but may be a mixture of a plurality of kinds of protrusions having different shapes.

For example, the protrusions are positioned so as to form each side or corner of a multiplicity of polygons so that the protrusions form a grid pattern in which adjoining ones of the polygons have a common side. For example, the grid pattern is continuous repetition of polygons having the same shape, which are equilateral triangles, squares, or regular hexagons. However, the grip pattern may be continuous repetition of rectangles, rhombuses, parallelograms, scalene triangles, irregular hexagons, etc. The grid pattern may be a grid pattern in which a plurality of types of polygons are regularly repeated, or a grid pattern in which a plurality of types of polygons irregularly adjoin each other. Various grid patterns are thus possible. The protrusions may be arranged in various manners. For example, the multiplicity of protrusions may be randomly arranged. Alternatively as in the seventh aspect of the invention, the protrusions may be arranged in the arrangement pattern in which each set of protrusions are formed by a pair of protrusions arranged in line in the one linear direction.

For example, the protrusions are provided one by one on each side of the polygons, but two or more protrusions may be provided on each side of the polygons. In the case of the polygons whose sides have different lengths, such as rectangles or parallelograms, the number of protrusions may be different between the shorter side and the longer side. The protrusions are provided such that the longitudinal direction of each protrusion is parallel to a corresponding one of the sides of the polygons. However, the protrusions may be provided such that the longitudinal direction of each protrusion is perpendicular to a corresponding one of the sides of the polygons, or may be provided in a tilted attitude at a predetermined angle. Alternatively. Whether the longitudinal direction of the protrusion is parallel or perpendicular to the side of the polygon may vary depending on the position of the protrusion in the grid pattern.

In order to improve a soft feel, it is desirable that the multiplicity of protrusions provided so as to spread all over the plate-like portion be arranged at predetermined intervals according to the protrusion height so that the protrusions do not interfere with each other during flexural deformation. However, for example, the protrusions may be arranged so that the plurality of protrusions interfere with each other in a predetermined deformation stage.

The tilted surface or the textured surface is preferably used as the deformation guide portion. However, it is also possible to merely provide a stepped portion, a wall surface, etc. that hinders the sliding movement of the tip end of the protrusion in the opposite direction to the one direction. In the case where the protrusion has a rectangular shape as viewed in plan, the protrusion is flexurally deformed in its lateral direction perpendicular to its longitudinal direction. Accordingly, the deformation guide portion is provided so as to flexurally deform the protrusion one of the lateral directions. In the case where the protrusion has a columnar shape and can be flexurally deformed along the entire circumference about its axis, a tilted surface etc. that can flexurally deform the protrusion in one direction about the axis is provided as the deformation guide portion.

In the second aspect of the invention, the accommodating recess that accommodates the protrusion flexurally deformed in the one direction is provided so as to be continuous with the deformation guide portion. This accommodating recess need not necessarily be able to completely accommodate the flexurally deformed protrusion, and need only be able to accommodate at least a part of the flexurally deformed protrusion. This accommodating recess is provided parallel to the one direction that is the flexural deformation direction of the protrusion, but a stepped portion, a tilted surface, a curved surface, etc, at the end of the accommodating recess may be used as the deformation guide portion. For example, the curved surface of the third aspect of the invention is provided so as to have fixed curvature. However, a curved surface Whose curvature is varied stepwise or continuously may be provided. Such a curved surface may be used that is formed by connecting small flat surfaces and that can be regarded as having a curved shape as a whole.

In the fourth aspect of the invention, the tilted surface is provided as the deformation guide portion. The tilt angle of this tilted surface may be constant or may be varied stepwise or continuously. A curved surface having an arc shape can be regarded as the tilted surface. In the fifth aspect of the invention, the stopper is provided on the downstream side of the tilted surface. However, the stopper is not necessarily required to carry out the fourth aspect of the invention. For example, in the case where the pair of protrusions are flexurally deformed inward, namely toward each other, as in the seventh aspect of the invention, a certain amount or more of flexural deformation of the protrusions can be restricted by contact between the protrusions. Not only in the case of providing the tilted surface as the deformation guide portion, but also in the case of using any other deformation guide portion such as the textured surface, the stopper that restricts the amount of flexural deformation of the protrusion can be provided on the downstream side in the one direction to restrict the deformation amount.

In the sixth aspect of the invention, the textured surface is provided as the deformation guide portion. However, since the textured surface functions as a frictional surface having a larger friction coefficient than the remaining region of the mating surface, the level of roughness of the textured surface is determined as appropriate. In the case where the second member is molded with a resin material, the textured surface can be formed simultaneously with molding of the second member by forming the textured surface on a mold. However, the textured surface may be provided by a later process. When carrying out other aspects of the invention, a friction member having a large friction coefficient may be embedded in the mating surface, or a sliding member having a small friction coefficient may be embedded in the mating surface and the protrusion may be caused to slide and move toward the sliding member.

EMBODIMENTS

Embodiments of the present invention will be described in detail below with reference to the accompanying drawings.

FIG. 1 is a vertical section of an ornament 10 to which the present invention is applied. The ornament 10 is intended to be provided in a shoulder portion (the lower end portion of a window) at the upper end of a vehicle door trim. The ornament 10 is a laminated composite part that is formed by a plate-like base material 14 and a surface layer member 16 set on a surface 22 of the base material 14 so as to be substantially parallel to the surface 22. The ornament 10 corresponds to a plate-like panel, and the surface 22 of the base material 14 corresponds to a mating surface.

The surface layer member 16 is a second member, and is molded as a single-piece member with a relatively soft, elastically deformable synthetic resin material such as soft polyvinyl chloride. The surface layer member 16 has a plate-like portion 18 substantially parallel to the surface 22, and a multiplicity of fine protrusions 20 that protrude toward the surface 22 of the base material 14 are formed integrally with the plate-like portion 18 on the back surface of the plate-like portion 18. These fine protrusions 20 create space 24 between the plate-like portion 18 and the surface 22. An outer peripheral terminal portion 26 of the plate-like portion 18 wraps around an outer peripheral edge of the base material 14 and is retained by a retaining portion, not shown, with the tip ends of the fine protrusions 20 being in close contact with the surface 22. The surface layer member 16 is thus fixedly attached to the base material 14. The base material 14 corresponds to a first member, and is molded as a single-piece member with a synthetic resin material harder than the surface layer member 16, such as polypropylene. The base material 14 is fixedly attached to the vehicle door trim via an attachment portion 30 provided on the back surface of the base material 14. The fine protrusions 20 correspond to protrusions.

Figure 2A:
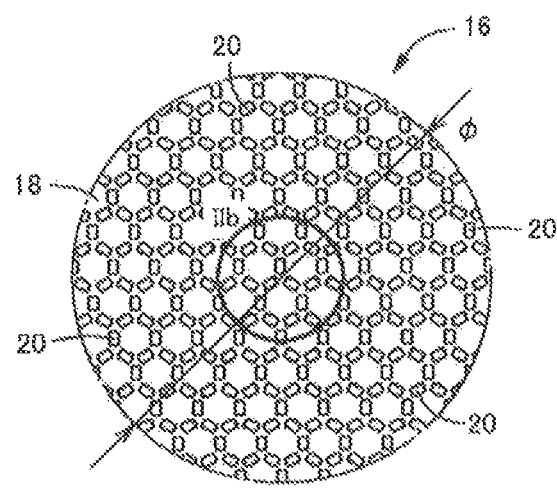
Figure 2B:
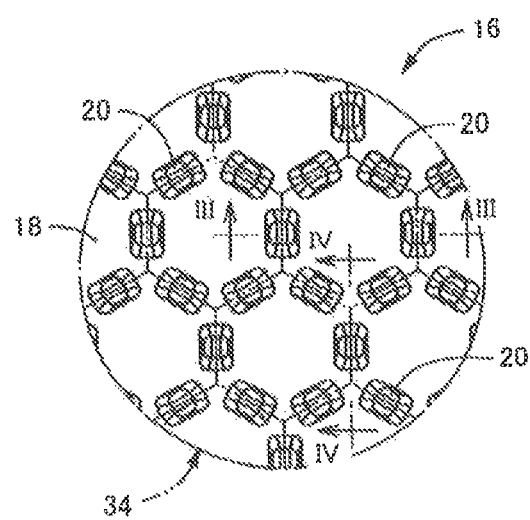
Figure 3:
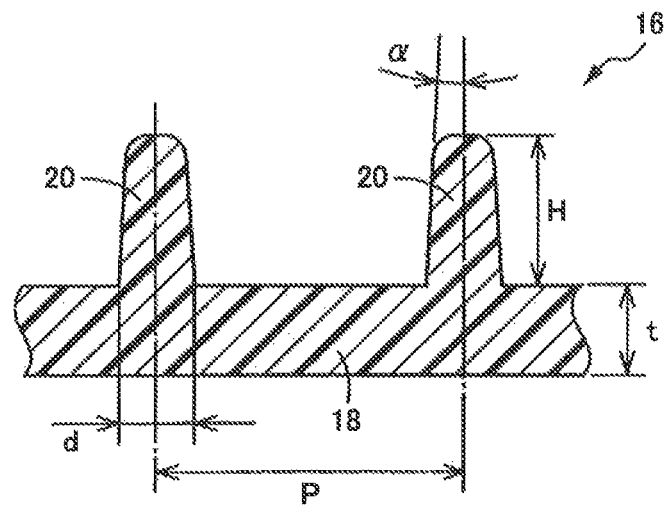
FIG. 3 is an enlarged elevational section taken along line III-III and viewed in the direction of arrows in FIG. 2(b).
Figure 4:
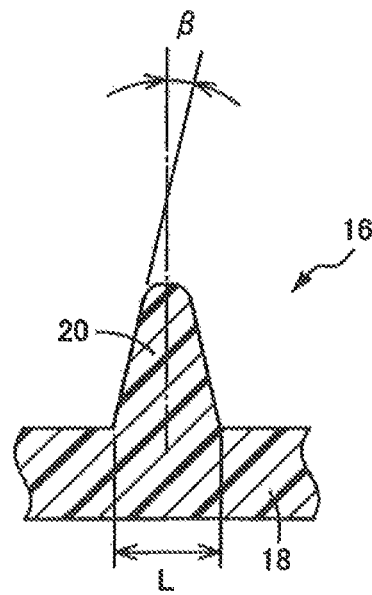
FIG. 4 is an enlarged elevations section taken along line IV-IV and viewed in the direction of arrows in FIG. 2(b).

FIGS. 2(a) and 2(b) show diagrams illustrating the multiplicity of fine protrusions 20 formed so as to spread all over the back surface of the surface layer member 16. FIG. 2(a) is a plan view showing the fine protrusions 20 close to their actual size (diameter φ≈50 mm), and FIG. 2(b) is an enlarged plan view of a portion 11b in FIG. 2(a). These plan views show the fine protrusions 20 as viewed in a direction perpendicular to the plate-like portion 18. FIG. 3 is an enlarged elevational section taken along line and viewed in the direction of arrows in FIG. 2(b). FIG. 4 is an enlarged elevational section taken along line IV-IV and viewed in the direction of arrows in FIG. 2(b). As can be seen from these figures, the multiplicity of fine protrusions 20 have the same shape, and have a longitudinal shape (in the present embodiment, a rectangular shape) as viewed in plan (in the state of FIGS. 2(a) and 2(b)) in the direction perpendicular to the plate-like portion 18. The fine protrusions 20 are positioned so as to form each side of a multiplicity of polygons having the same shape and are disposed in such a position that the longitudinal direction of each fine protrusion 20 is substantially parallel to a corresponding one of the sides of the polygons so that the fine protrusions 20 form a grid pattern 34 in which adjoining ones of the polygons have a common side. In the present embodiment, each of the fine protrusions 20 has a rectangular shape with four round corners, and is disposed in such a position that the longitudinal direction thereof coincides with a direction in which a corresponding one of the sides of the polygon extends, as viewed in plan. As shown by two-dot chain lines in FIG. 2(b), the grid pattern 34 is a honeycomb pattern formed by continuous repetition of regular hexagons having a fixed size as the polygons, and the fine protrusions 20 are provided one by one in a central portion of each side of the regular hexagons.

As can be seen from FIGS. 3 and 4, each of the fine protrusions 20 has a gently tapered shape so that its sectional area decreases toward its tip end. Both the elevational section in FIG. 3 taken along the lateral direction perpendicular to the longitudinal direction and the elevational section in FIG. 4 taken along the longitudinal direction have a symmetrical shape with respect to a neutral plane perpendicular to the plate-like portion 18, and have a round peripheral edge (both ends of the sectional shape) at the tip end. The fine protrusions 20 will be further described below. A pitch P as an interval between two parallel sides of each regular hexagon of the grid pattern 34, namely the distance between the centers of the fine protrusions 20 provided on the two sides, is 4 mm≤P≤7 mm, and in the present embodiment, about 5 mm. A height dimension H of the fine protrusions 20 is 2 mm≤H≤3.5 mm, and in the present embodiment, about 2.5 mm. A lateral dimension d of the fine protrusions 20 is 1 mm≤d≤2 mm, and in the present embodiment, about 1.2 mm. A longitudinal dimension L of the fine protrusions 20 is 1.5 mm≤L≤2.5 mm, and is larger than the lateral dimension d. In the present embodiment, the longitudinal dimension L is about 1.8 mm. A tilt angle α of both sidewalls in the lateral direction of the fine protrusions 20 is 2°≤α≤5°, and in the present embodiment, about 3°. A tilt angle β of both edges in the longitudinal direction of the fine protrusions 20 is in the range of 10° to 15°, and in the present embodiment, about 13°. A thickness t of the plate-like portion 18 is in the range of 1 mm≤t≤2 mm, and in the present embodiment, about 1.5 mm. These dimensions and angles are determined as appropriate in view of a material of the surface layer material 16 etc. so that the surface layer material 16 has a predetermined feel (soft feel and rigid feel etc.) and the strength.

In the ornament 10, when the plate-like portion 18 of the surface layer member 16 is pressed with a finger or hand at a pressing load F, the tip ends of the fine protrusions 20 are pressed against the surface 22 of the base material 14 and elastically deformed. The ornament 10 thus has cushioning properties. In the present embodiment, since the ornament 10 includes the plate-like base material 14 harder than the surface layer member 16, predetermined rigidity and strength are ensured by the base material 14, and the surface layer member 16 has an excellent feel when pressed by a finger or hand due to elastic deformation of the fine protrusions 20 provided on the surface layer member 16. The pressing load F is not applied to a single point, but is applied in a planar manner to a relatively large region including the plurality of fine protrusions 20.

Figure 5A:
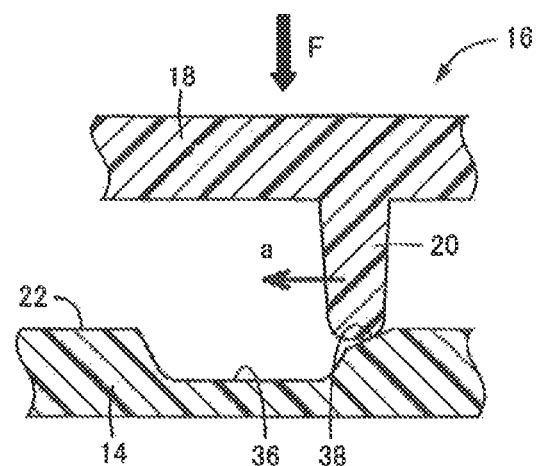
FIGS. 5(a) and 5(b) show sectional views illustrating the deformation manner at the time the fine protrusion provided on the surface layer member is pressed by a base material and flexurally deformed.
Figure 5B:
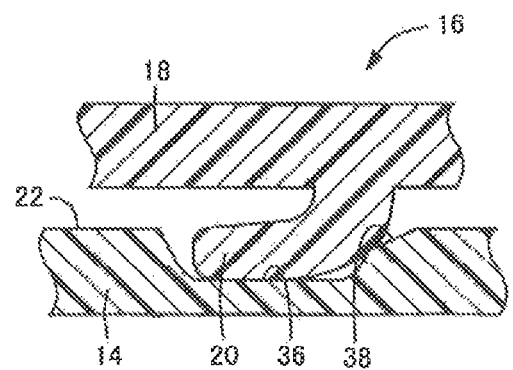

In the present embodiment, as shown in FIGS. 5(a) and 5(b), accommodating recesses 36 are formed in those portions of the surface 22 of the base material 14 against which the fine protrusions 20 are pressed. A chamfered tilted surface 38 is formed at the opening edge of one sidewall of each accommodating recess 36. The tilted surface 38 defines the direction in which the fine protrusion 20 is flexurally deformed. Each accommodating recess 36 accommodates the flexurally deformed fine protrusion 20. Each accommodating recess 36 has a lateral dimension (dimension in a direction perpendicular to the plane of paper of FIGS. 5(a) and 5(b)) larger than the longitudinal dimension L of the fine protrusion 20, and has a predetermined longitudinal dimension in one (leftward shown by an arrow a in FIG. 5(a)) of the lateral directions of the fine protrusion 20. In the assembled state shown in FIG. 5(a), the tilted surface 38 engages with the tip end of the fine protrusion 20, is parallel to the longitudinal direction of the fine protrusion 20, and is tilted with respect to a plane perpendicular to the centerline (center plane) of the fine protrusion 20. Accordingly, if the pressing load F is applied to the surface layer member 16, the tip end of the fine protrusion 20 is subjected to a component force (reaction force) in one direction shown by the arrow a due to the tilt of the tilted surface 38, and slides and moves in the one direction a. The fine protrusion 20 is thus flexurally deformed in the one direction a and accommodated in the accommodating recess 36, as shown in FIG. 5(b). The depth dimension of the accommodating recess 36 is substantially the same as the lateral dimension d of the fine protrusion 20, so that substantially the entire fine protrusion 20 is accommodated in the accommodating recess 36 as shown in FIG. 5(b). The tilted surface 38 corresponds to a deformation guide portion.

Figure 6:
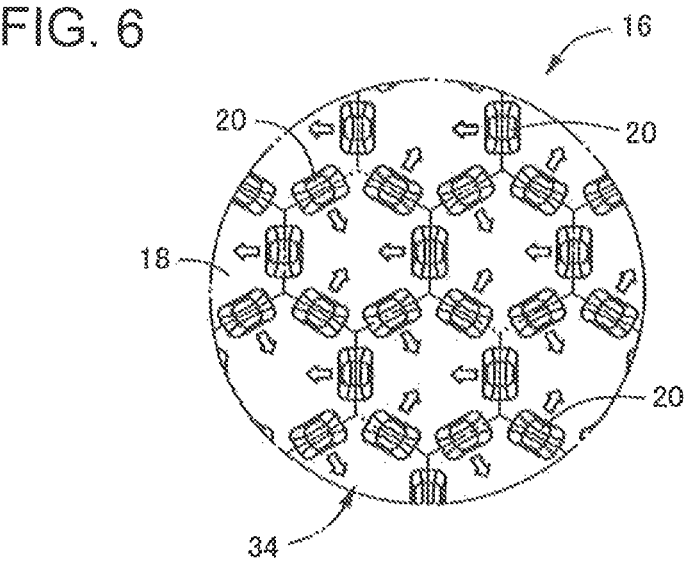
FIG. 6 is a plan view of the flexural deformation directions of the fine protrusions shown by white arrows in FIG. 2(b).

The accommodating recess 36 is provided for each of the multiplicity of fine protrusions 20, and each accommodating recess 36 flexurally deforms a corresponding one of the fine protrusions 20 in the predetermined one direction a. White arrows in FIG. 6 show an example of a pattern of the flexural deformation directions of the multiplicity of fine protrusions 20 arranged so as to form the grid pattern 34. The directions shown by the white arrows are substantially the same as the one direction a. In this example, the flexural deformation direction of each fine protrusion 20 is inward of the polygon or outward of the polygon of the grid pattern 34 (inward of the polygon adjoining this polygon), and is determined so that the flexural deformation directions of the fine protrusions 20 are alternately inward and outward of the polygon around a center of each polygon. The fine protrusions 20 are thus densely arranged in such a range that the fine protrusions 20 do not interfere with each other.

In the ornament 10, the multiplicity of fine protrusions 20 are formed so as to spread all over the plate-like portion 18. These fine protrusions 20 are guided by the tilted surfaces 38 formed in the surface 22, and are flexurally deformed in the one direction a determined for each fine protrusion 20. This facilitates flexural deformation of the fine protrusions 20 and improves the soft feel (cushioning properties). The flexural deformation direction of each fine protrusion 20 can be controlled. The deformation manner of the fine protrusions 20 during elastic deformation is stabilized, and variation in feel obtained when pressing the surface layer member 16 with a finger or hand is suppressed.

Figure 15A:
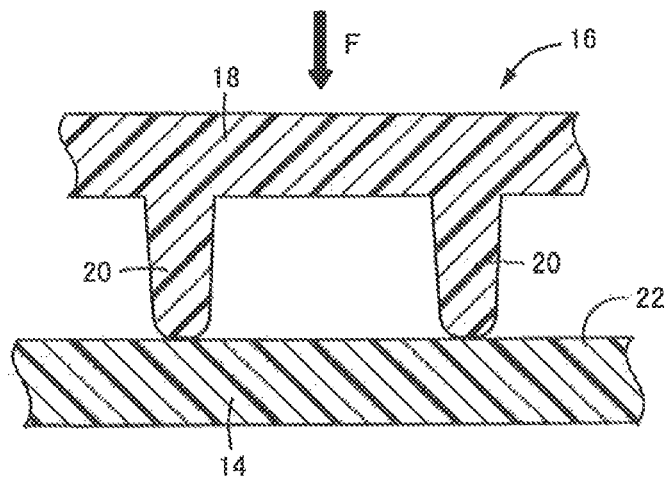
FIGS. 15(a) and 15(b) show sectional views corresponding to FIGS. 9(a) and 9(b), illustrating the reaction force generated in a plate-like portion at the time the pair of fine protrusions in one set of fine protrusions provided on the surface layer member in the arrangement pattern of FIG. 8 are pressed by the base material and are flexurally deformed in the same directions.
Figure 15B:
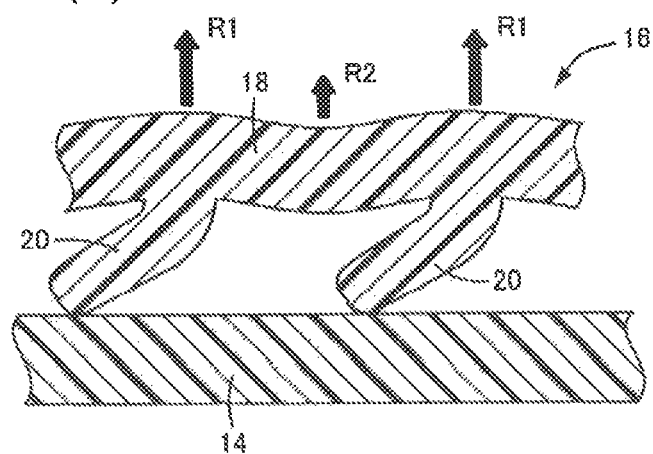

Moreover, the flexural deformation directions of the multiplicity of fine protrusions 20 are independently determined. Accordingly, for example, by densely arranging the fine protrusions 20 in such a range that the fine protrusions 20 do not interfere with each other or densely arranging the fine protrusions 20 such that the fine protrusions 20 interfere with each other in a predetermined deformed state, it is possible to suppress variation in feel due to the presence and absence of the fine protrusions 20, and to ensure a predetermined soft feel based on elastic deformation of the fine protrusions 20. Specifically, for example, in the case where the pressing load F is applied to the plate-like portion 18 and the fine protrusions 20 are elastically deformed as shown in FIGS. 15(a) and 15(b), a reaction force R1 in the region where the fine protrusion 20 is disposed is larger than a reaction force R2 in the intermediate region (region where no fine protrusion 20 is disposed), namely R1>R2. The larger the interval between the fine protrusions 20 is, the larger the difference between the reaction forces R1, R2 is, and the larger the variation in feel is.

In the present embodiment, the accommodating recess 36 is continuous with the tilted surface 38, and the fine protrusion 20 enters the accommodating recess 36 and is substantially entirely accommodated therein when flexurally deformed by the tilted surface 38. Accordingly, for example, even if the plate-like portion 18 is pressed until it comes into contact with the surface 22 of the base material 14, unevenness of the pressed surface (design surface) due to the presence and absence of the fine protrusions 20 is absorbed by the accommodating recesses 36. This eases discomfort caused by the unevenness when pressing the surface layer member 16, and further improves the feel. Specifically, as shown in, e.g., FIG. 15(b), in the case where the surface 22 of the base material 14 is a flat surface, the plate-like portion 18 is deformed into a wave shape due to the presence and absence of the fine protrusions 20, which may cause discomfort.

In the present embodiment, the tilted surface 38 tilted with respect to the plane perpendicular to the centerline of the fine protrusion 20 serves as the deformation guide portion. Each fine protrusion 20 can therefore be reliably and smoothly flexurally deformed in the one direction a that is determined by the tilted surface 38. Moreover, the soft feel can be easily adjusted by controlling flexural deformability of the fine protrusions 20 by changing the tilt angle of the tilted surface 38.

In the present embodiment, the fine protrusions 20 are positioned so as to form each side of the multiplicity of polygons, so that the fine protrusions 20 form the grid pattern 34 in which the multiplicity of polygons continuously adjoin each other. The multiplicity of fine protrusions 20 can thus be arranged in a fixed arrangement pattern, which suppresses variation in feel when pressing the surface layer member 16 with a finger or hand, in particular, the polygons are regular hexagons, the fine protrusions 20 are provided one by one on each side of the polygons, and in the example of FIG. 6, the one direction a is set so that the flexural deformation directions of the fine protrusions 20 around the center of each polygon are alternately inward and outward of the polygon. Accordingly, densely arranging the fine protrusions 20 in such a range that the fine protrusions 20 do not interfere with each other can suppress variation in feel due to the presence and absence of the fine protrusions 20.

Another embodiment of the present invention will be described below. In this embodiment, those portions that are substantially the same as the above embodiment are denoted with the same reference characters, and detailed description thereof will be omitted.

Figure 7A:
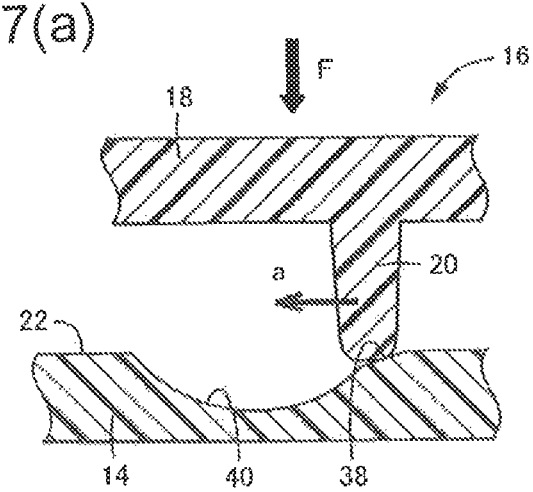
FIGS. 7(a) and 7(b) are diagrams for explaining another example having a different deformation manner of the fine protrusions, and sectional views corresponding to FIGS. 5(a) and 5(b).
Figure 7B:
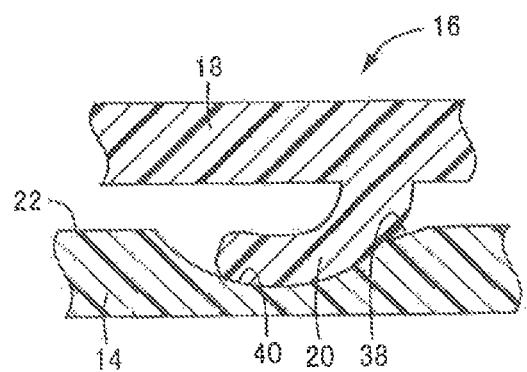

FIGS. 7(a) and 7(b) show sectional views corresponding to FIGS. 5(a) and 5(b), showing another example of the accommodating recess. In the present embodiment, an accommodating recess 40 having a curved surface (in the embodiment, an arc-shaped surface) smoothly curved in one direction a is formed in the surface 22 of the base material 14, and the tilted surface 38 is formed at the opening edge of one end of the accommodating recess 40. In this case, as shown in FIG. 7(b), the fine protrusion 20 is smoothly flexurally deformed along the curved surface of the accommodating recess 40. The reaction force when the surface layer member 16 is pressed is smoothly increased, which further improves the feel.

Figure 8:
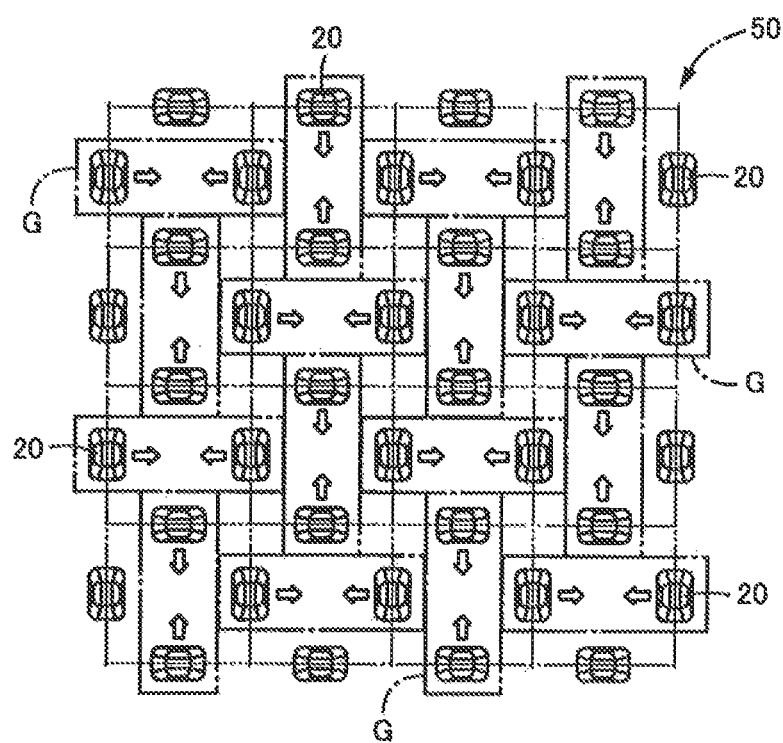
FIG. 8 is a diagram for explaining another example of the arrangement pattern of the fine protrusions, and a plan view corresponding to FIG. 6.

FIG. 8 is a plan view corresponding to FIG. 6, showing another example of the arrangement pattern of the fine protrusions 20. In the present embodiment as well, the multiplicity of fine protrusions 20 are arranged so as to form a grid pattern 50 of polygons as shown by two-dot chain lines in the figure. However, in the present embodiment, the grid pattern 50 is continuous repetition of squares having a fixed size, and the fine protrusions 20 are provided one by one in the central portion of each side of the squares so as to be parallel to the side. The deformation guide portions are provided for each fine protrusion 20 in the following manner. Each set G of fine protrusions are formed by a pair of fine protrusions 20 arranged in line in one linear direction as shown in each rectangle of chain line in the figure, and a pair of deformation guide portions are provided for each pair of fine protrusions 20 in each set G. As shown by white arrows in the figure, each pair of deformation guide portions are provided symmetrically in the one linear direction so that the pair of fine protrusions 20 are flexurally deformed toward each other in the one linear direction.

Figure 9A:
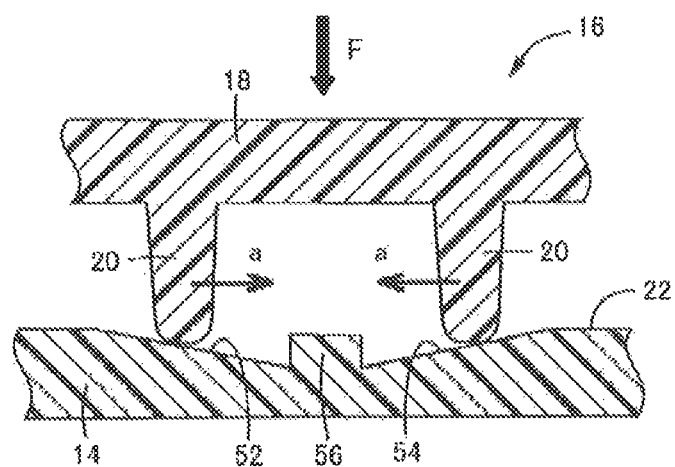
FIGS. 9(a) and 9(b) show sectional views corresponding to FIGS. 5(a) and 5(b), illustrating the deformation manner at the time a pair of fine protrusions in one set of fine protrusions provided on the surface layer member in the arrangement pattern of FIG. 8 are pressed by a pair of tilted surfaces provided on the base material and are flexurally deformed inward.
Figure 9B:
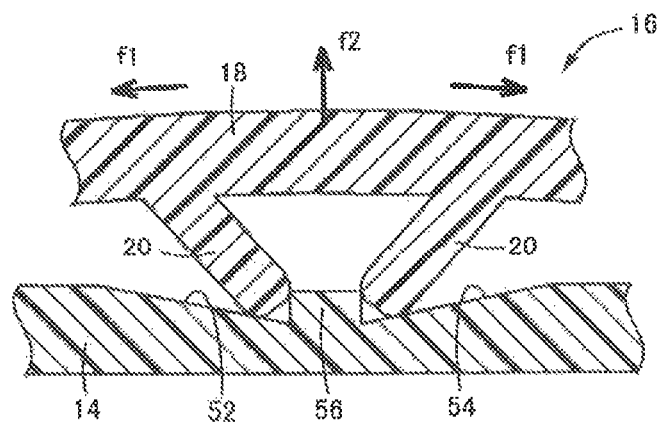

FIGS. 9(a) and 9(b) show elevational sections taken along the one linear direction in which the pair of fine protrusions 20 are arranged, showing a specific example of the deformation guide portions for each set G. FIG. 9(a) shows an assembled state, and FIG. 9(b) shows a state where the fine protrusions 20 have been flexurally deformed due to the pressing load F applied to the surface layer member 16. In this example, tilted surfaces 52, 54 are formed symmetrically as the pair of deformation guide portions, so that the tip ends of the pair of fine protrusions 20 slide and move in the one direction a, and the pair of fine protrusions 20 are flexurally deformed. In this case, the regions of the plate-like portion 18 which correspond to the roots of the pair of fine protrusions 20 are subjected to stress in the direction shown by an arrow f1 in FIG. 9(b) due to the deformation reaction force of the fine protrusions 20. Accordingly, the intermediate region of the plate-like portion 18 which is located between the fine protrusions 20 is subjected to stress that curves the plate-like portion 18 so that the plate-like portion 18 protrudes in the direction away from the base material 14, as shown by an arrow f2. This stress f2 that is applied to the intermediate region between the fine protrusions 20 reduces variation in reaction force due to the presence and absence of the fine protrusions 20 when the surface layer member 16 is pressed at the pressing bad F. That is, this stress f2 increases the reaction force R2 shown in FIG. 15(b), and reduces the difference between the reaction force R2 and the reaction force RI in the region where the fine protrusion 20 is disposed. FIGS. 15(a) and 15(b), show sectional views corresponding to FIGS. 9(a) and 9(b), showing the case where no deformation guide portion is provided and showing the state where the fine protrusions 20 have been flexurally deformed in the same direction.

Referring back to FIGS. 9(a) and 9(b), the tip ends of the fine protrusions 20 are partially accommodated in recesses provided with the tilted surfaces 52, 54. This also reduces variation in reaction force due to the presence and absence of the fine protrusions 20. The regions where the tilted surfaces 52, 54 are provided, particularly the downstream parts of these regions can be regarded as accommodating recesses.

A stopper 56, which has the shape of a protrusion and with which the tip ends of the fine protrusions 20 come into contact, is provided at an intermediate position between the downstream parts of the pair of tilted surfaces 52, 54 to restrict a certain amount or more of flexural deformation of the fine protrusions 20. Since elastic deformation of the fine protrusions 20 is thus restricted, the reaction force that is applied to the surface layer member 16 is increased, whereby an appropriate rigid feel (not too soft) can be obtained. A further improved feel can be achieved by this rigid feel together with the soft feel obtained by the elastic deformation in the initial stage of deformation of the fine protrusions 20.

In the present embodiment, the arrangement pattern of the fine protrusions 20 and the tilted surfaces 52, 54 can be set for each set G surrounded by the chain line in FIG. 8. This facilitates setting of the arrangement pattern. Moreover, the soft feel and the rigid feel can be easily tuned by changing the tilt angle of the tilted surfaces 52, 54, the interval between the fine protrusions 20, the size of the stopper 56, etc. for each set G.

Figure 10A:
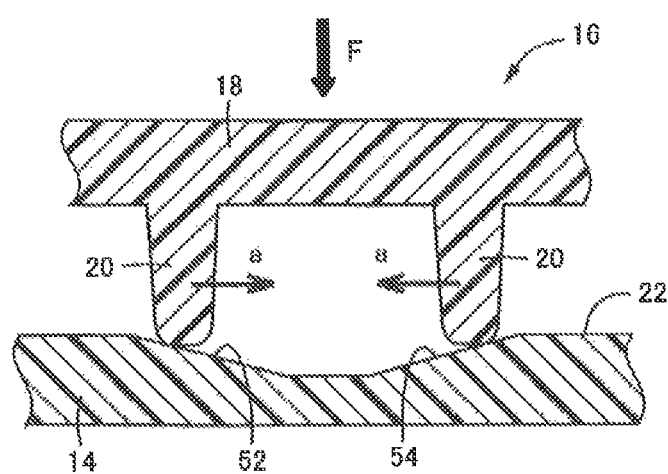
FIGS. 10(a) and 10(b) are sectional views for explaining yet another example, which a stopper between the pair of tilted surfaces is omitted in FIGS. 9(a) and 9(b).
Figure 10B:
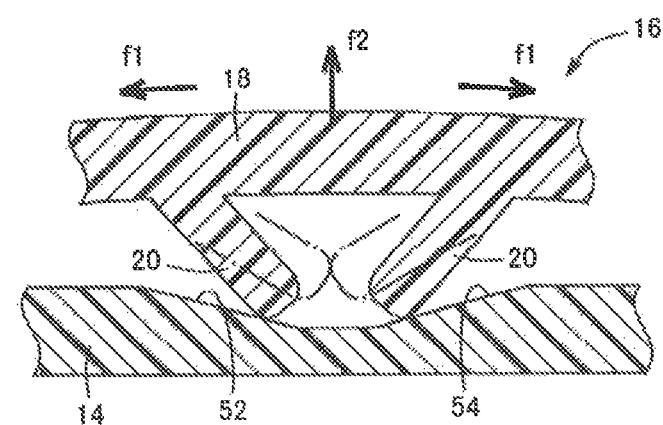

FIGS. 10(a) and 10(b) show sectional views corresponding to FIGS. 9(a) and 9(b), showing the case where the stopper 56 is omitted. In this case, the fine protrusions 20 can further be elastically deformed from the state shown in FIG. 10(b), whereby an excellent soft feel can be obtained. When the fine protrusions 20 are elastically deformed and their tip ends come into contact with each other as shown by chain lines in the figure, further elastic deformation is restricted and the reaction force is increased as in the embodiment of FIGS. 9(a) and 9(b), whereby a predetermined rigid feel can be obtained. The soft feel and the rigid feel can therefore be tuned by changing the interval between the pair of fine protrusions 20 to change the timing the tip ends come into contact with each other (including the case where the tip ends do not contact each other).

Figure 11:
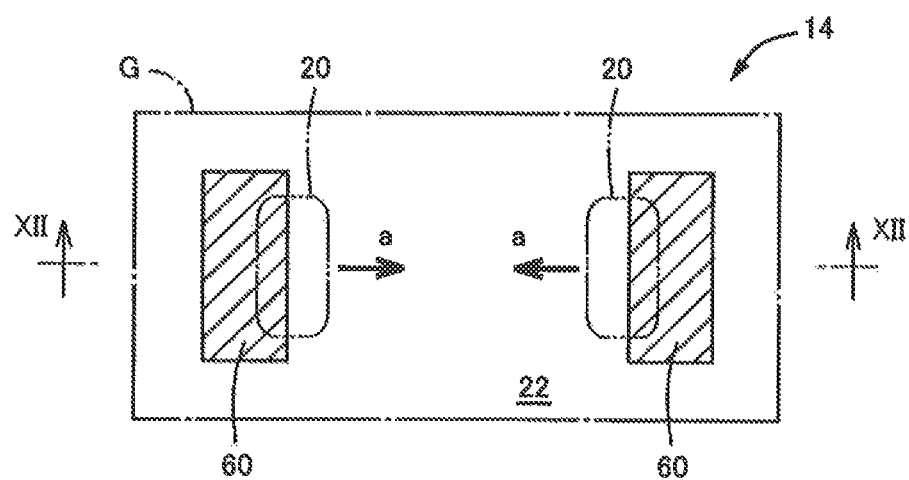
FIG. 11 is a diagram for explaining yet another example of the deformation guide portion, which the pair of fine protrusions in one set of fine protrusions are respectively flexurally deformed, a plan view showing a pair of textured surface provided on a base material in the arrangement pattern of FIG. 8.
Figure 12A:
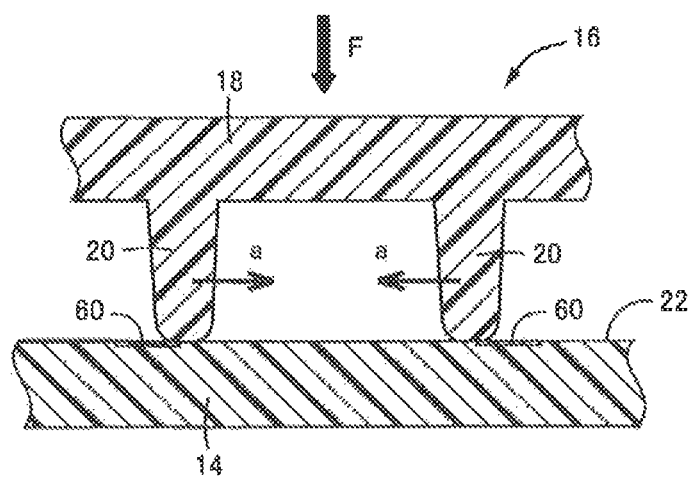
FIGS. 12(a) and 12(b) show sectional views corresponding to FIGS. 10(a) and 10(b), illustrating the deformation manner at the time the pair of fine protrusions in one set of fine protrusions provided on the surface layer member in the example of FIG. 11 are flexurally deformed inward by the pair of textured surface provided on the base material.
Figure 12B:
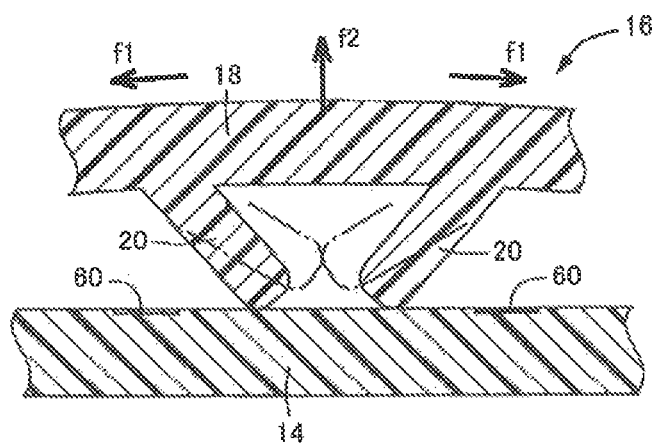

FIG. 11 is a plan view showing the surface 22 of the base material 14 in another embodiment of the deformation guide portions for each set G. The surface 22 has textured surfaces 60 (shaded regions) with fine roughness which hinder sliding movement of the tip ends of the fine protrusions 20 in the opposite direction to the one direction a by friction. For example; the textured surfaces 60 can be formed simultaneously with molding of the base material 14 by providing fine roughness on the molding surface of a mold for molding the base material 14. The textured surfaces 60 are provided so as to be shifted outward of the fine protrusions 20 in one linear direction (the lateral direction FIG. 11) so that the textured surfaces 60 overlap the regions the pair of fine protrusions 20 contact (the regions shown by two-dot chain lines in FIG. 11). This allows the fine protrusions 20 to slide and move to be flexurally deformed in the one direction a in which the friction is small. FIGS. 12(a) and 12(b) show sectional views corresponding to FIGS. 10(a) and 10(b), showing elevational sections taken along line and viewed in the direction of arrows in FIG. 11. The present embodiment has functions and effects similar to those of the embodiment of FIGS. 10(a) and 10(b). In the present embodiment, the textured surfaces 60 need only be formed in the predetermined regions of the surface 22 of the base material 14. The present embodiment can therefore be easily implemented by, e.g., providing the textured surfaces 60 simultaneously with molding of the base material 14.

Figure 13:
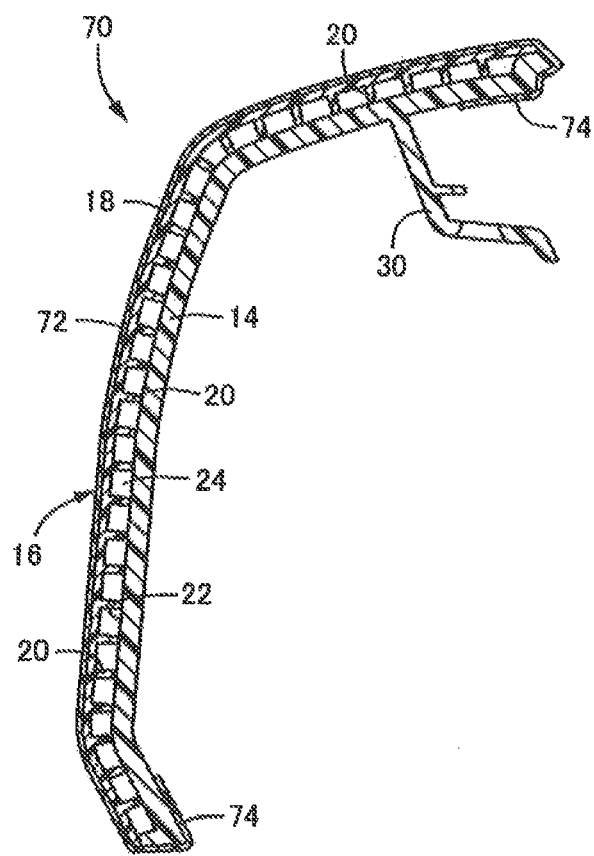
FIG. 13 is a diagram for explaining another example, which the surface material is fixedly attached to a surface layer member, a sectional view corresponding to FIG. 1.

An ornament 70 of FIG. 13 is different from the ornament 10 in that a surface material 72 is fixedly attached to the surface of the surface layer member 16, namely the surface on the opposite side of the plate-like portion 18 from the surface on which the fine protrusions 20 are provided, and the ornament 70 has a three-layer structure including the plate-like base material 14. The surface material 72 is made of e.g., woven fabric, nonwoven fabric, knitted fabric, vinyl chloride, or a soft film, and is molded integrally with the surface layer member 16. The surface material 72 is therefore molded simultaneously with the surface layer member 16, and is fixedly attached to the surface of the surface layer member 16. An outer peripheral terminal portion 74 of the surface material 72 wraps around the outer peripheral edge of the base material 14 and is retained by a retaining portion, not shown.

The ornament 70 also has functions and effects similar to those of the ornament 10. Moreover, since the surface layer member 16 is covered by the surface material 72, the surface on the opposite side of the plate-like portion 18 of the surface layer member 16 from the fine protrusions 20 is not exposed to the outside even if it has any sink marks, uneven gloss, etc. Moreover, scratches of the surface layer member 16 can be prevented. This increases the choice of resin materials for the surface layer member 16, and increases the flexibility of design in terms of the shape of the fine protrusions 20 related to the feel, etc., whereby the feel can be adjusted more easily and appropriately.

Figure 14:
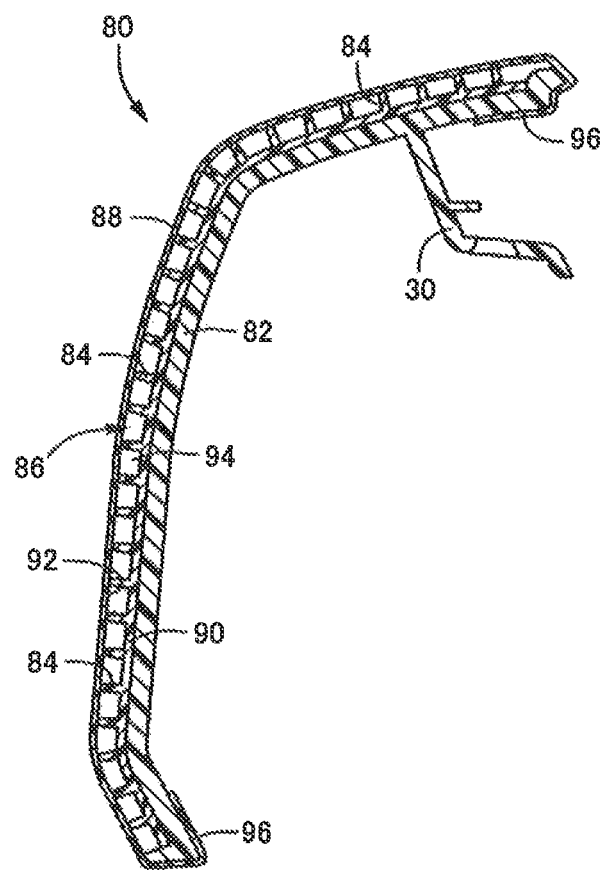
FIG. 14 is a diagram for explaining yet another example, which a first member is a surface layer member and a second member is a cushion member fixed to the base material, sectional view corresponding to FIG. 1.

In an ornament 80 of FIG. 14, a cushion member 86 having a multiplicity of fine protrusions 84 is provided on the surface of a plate-like base material 82, and a surface layer member 88 is attached so as to be set on the fine protrusion 84 side of the cushion member 86. Like the base material 14, the base material 82 is made of a relatively hard synthetic resin material, and the attachment portion 30 etc. is formed integrally with the base material 82 and is provided on the back surface of the base material 82. The cushion member 86 corresponds to the second member. The cushion member 86 is made of an elastically deformable synthetic resin material like the surface layer member 16, and has a plate-like portion 90 that is fixedly attached to the base material 82 so as to be in close contact with the surface of the base material 82. The multiplicity of fine protrusions 84 are formed integrally with the plate-like portion 90. The fine protrusions 84 are formed similarly to the fine protrusions 20, and are provided so as to protrude from the plate-like portion 90 toward the surface layer member 88, and their tip ends are in close contact with a back surface 92 of the surface layer member 88, so that space 94 is created between the back surface 92 and the plate-like portion 90. The back surface 92 corresponds to the mating surface. The surface layer member 88 corresponds to the first member, and in the present embodiment, is made of a relatively soft synthetic resin material like the surface layer member 16. An outer peripheral terminal portion 96 of the surface layer member 88 wraps around an outer peripheral edge of the base material 82 and is retained by a retaining portion, not shown. The surface material 72 may further be provided on the surface layer member 88.

In the ornament 80, when the surface layer member 88 is pressed with a finger or hand, the back surface 92 of the surface layer member 88 is pressed by the tip ends of the fine protrusions 84 of the cushion member 86, whereby an excellent feel can be obtained based on elastic deformation of the fine protrusions 84. The ornament 80 thus has effects similar to those of the ornament 10. Moreover, since the cushion member 86 having the fine protrusions 84 is covered by the surface layer member 88, and the plate-like portion 90 of the cushion member 86 is fixed to the base material 82, the surface on the opposite side of the plate-like portion 90 from the fine protrusions 84 is not exposed to the outside even if it has any sink marks, uneven gloss, etc. This increases the choice of resin materials for the cushion member 86, and increases the flexibility of design in terms of the shape of the fine protrusions 84 related to the feel, etc., whereby the feel can be adjusted more easily and appropriately.

In the ornament 80 as well, the flexural deformation direction of the fine protrusions 84 can be controlled by providing, on the back surface 92 of the surface layer member 88 against which the fine protrusions 84 are pressed, the tilted surfaces 38, 52, 54, the textured surfaces 60, the accommodating recesses 36, 40, etc. which serve as the deformation guide portions. The ornament 80 thus has functions and effects similar to those of the above embodiments.

Although the embodiments of the present invention are described above in detail based on the drawings, the embodiments are shown by way of example only, and the present invention can be embodied in various modified or improved forms based on the knowledge of those skilled in the art.

NOMENCLATURE OF ELEMENTS

10, 70, 80: ornament (laminated composite part) 14: base material (first member) 16: surface layer member (second member) 18, 90: plate-like portion 20, 84: fine protrusions (protrusions) 22: surface (mating surface) 24, 94: space 34, 50: grid pattern 36, 40: accommodating recess 38, 52, 54: tilted surface (deformation guide portion) 56: stopper 60: textured surface (deformation guide portion) 86: cushion member (second member) 88: surface layer member (first member) 92: back surface (mating surface) a: one direction F: pressing load G: each set.

The invention claimed is:

1. A laminated composite part including
   a first member comprising a predetermined mating surface, and
   a second member that is made of an elastically deformable resin material, that comprises a plate-like portion substantially parallel to the mating surface and including a multiplicity of protrusions formed integrally with the plate-like portion so as to protrude toward the mating surface so that space is created between the plate-like portion and the mating surface, and that is set on the first member such that the protrusions contact the mating surface,
   the laminated composite part having cushioning properties as tip ends of the protrusions are pressed by the mating surface and elastically deformed, wherein
   the multiplicity of protrusions are formed so as to spread all over the plate-like portion, and
   a deformation guide portion is provided for each protrusion in a region of the mating surface of the tip end of the protrusion contacts, so that when the protrusion is pressed, the deformation guide portion causes the tip end of the protrusion to slide and move along the mating surface in one direction determined for each protrusion and flexurally deforms the protrusion in the one direction.

2. The laminated composite part according to claim 1, wherein
   an accommodating recess that accommodates the protrusion flexurally deformed in the one direction is provided in the mating surface so as to be continuous with the deformation guide portion.

3. The laminated composite part according to claim 2, wherein
   the accommodating recess has a curved surface smoothly curved in the one direction in which the protrusion is flexurally deformed, and the protrusion is flexurally deformed along the curved surface.

4. The laminated composite part according to claim 1, wherein
   the deformation guide portion is a tilted surface tilted with respect to a plane perpendicular to a centerline of the protrusion.

5. The laminated composite part according to claim 4, wherein
   a stopper with which the tip end of the protrusion comes into contact is provided on a downstream side of the tilted surface to restrict a certain amount or more of flexural deformation of the protrusion.

6. The laminated composite part according to claim 1, wherein
   the deformation guide portion is a textured surface provided on the mating surface to hinder the sliding movement of the tip end of the protrusion in an opposite direction to the one direction by friction.

7. The laminated composite part according to claim 1, wherein
   a set of the protrusions is formed by a pair of the protrusions arranged in line in one linear direction, and a pair of the deformation guide portions are provided for each pair of the protrusions in each set, and
   each pair of the deformation guide portions for each set are provided symmetrically in the one linear direction so that the tip ends of the pair of the protrusions slide and move toward each other in the one linear direction.

8. The laminated composite part according to claim 1, wherein
   the multiplicity of protrusions are positioned so as to form each side of a multiplicity of polygons so that the protrusions form a grid pattern in which adjoining ones of the polygons have a common side,
   the polygons are squares or hexagons, and the protrusions are provided one by one on each side of the polygons, and
   the deformation guide portions are provided so that flexural deformation directions of the protrusions are inward or outward of the polygons and the flexural deformation directions of the protrusions are alternately inward and outward of the polygon around a center of each polygon.

9. The laminated composite part according to claim 1, wherein
the second member is a surface layer member, and
the first member is a plate-like base material made of a resin material harder than the surface layer member.

* * * * *